United States Patent
Taylor et al.

(10) Patent No.: US 12,321,864 B2
(45) Date of Patent: Jun. 3, 2025

(54) MULTI-HOP SEARCH FOR ENTITY RELATIONSHIPS

(71) Applicant: Salesforce, Inc., San Francisco, CA (US)

(72) Inventors: Aaron Michael Taylor, Cambridge, MA (US); Henry Forrest Leanna Wallace, Cambridge, MA (US)

(73) Assignee: Salesforce, Inc., San Francisco, CA (US)

( * ) Notice: Subject to any disclaimer, the term of this patent is extended or adjusted under 35 U.S.C. 154(b) by 963 days.

(21) Appl. No.: 17/100,697

(22) Filed: Nov. 20, 2020

(65) Prior Publication Data

US 2022/0164679 A1 May 26, 2022

(51) Int. Cl.
| | | |
|---|---|---|
| *G06N 5/022* | (2023.01) | |
| *G06F 16/901* | (2019.01) | |
| *G06F 16/9032* | (2019.01) | |
| *G06F 16/93* | (2019.01) | |
| *G06F 40/237* | (2020.01) | |
| *G06F 40/30* | (2020.01) | |

(52) U.S. Cl.
CPC ......... *G06N 5/022* (2013.01); *G06F 16/9024* (2019.01); *G06F 16/90332* (2019.01); *G06F 16/93* (2019.01); *G06F 40/237* (2020.01); *G06F 40/30* (2020.01)

(58) Field of Classification Search
CPC ............... G06F 16/93; G06F 16/90332; G06F 16/9024; G06F 40/237; G06F 40/30; G06N 5/022
USPC ......................................................... 706/45
See application file for complete search history.

(56) References Cited

U.S. PATENT DOCUMENTS

| | | | | |
|---|---|---|---|---|
| 8,751,505 | B2 * | 6/2014 | Carmel ................. | G06F 16/288 707/742 |
| 8,918,348 | B2 * | 12/2014 | Nie ........................ | G06F 16/285 706/12 |
| 10,474,708 | B2 | 11/2019 | Roberts et al. | |
| 10,839,021 | B2 | 11/2020 | Kleiman-weiner et al. | |
| 11,442,992 | B1 * | 9/2022 | Moon ..................... | G06N 20/00 |
| 2006/0116994 | A1 * | 6/2006 | Jonker ................... | G06Q 10/04 |
| 2007/0214179 | A1 * | 9/2007 | Hoang ................. | G06F 16/2428 |
| 2010/0030722 | A1 * | 2/2010 | Goodson ........... | G06Q 10/06393 706/54 |
| 2013/0155068 | A1 * | 6/2013 | Bier ....................... | G06Q 10/06 345/440 |

(Continued)

OTHER PUBLICATIONS

Balog, Krisztian. Entity-oriented search. Springer Nature, 2018. (Year: 2018).*

(Continued)

*Primary Examiner* — Thu V Huynh
(74) *Attorney, Agent, or Firm* — Butzel Long

(57) ABSTRACT

An unsupervised multi-hop search across a corpus of documents in a database or other data resource permits the identification of relationships between two entities mentioned in the corpus in cases where the two entities are not co-mentioned within any documents in the corpus (or not mentioned within document(s) with sufficient frequency or proximity to infer the relationship). The search can employ a beam search algorithm anchored by word embeddings and an A* graph traversal to calculate semantic distance between the entities as different paths through the corpus for different entity co-mentions are evaluated.

20 Claims, 6 Drawing Sheets

(56) References Cited

U.S. PATENT DOCUMENTS

| | | | | |
|---|---|---|---|---|
| 2013/0212081 | A1* | 8/2013 | Shenoy | G06F 16/9536 |
| | | | | 707/706 |
| 2014/0040275 | A1* | 2/2014 | Dang | G06F 16/2228 |
| | | | | 707/741 |
| 2015/0324454 | A1* | 11/2015 | Roberts | G06F 16/3349 |
| | | | | 707/734 |
| 2019/0325063 | A1* | 10/2019 | Han | G06F 16/24578 |
| 2019/0362246 | A1* | 11/2019 | Lin | G06F 16/9024 |
| 2020/0320111 | A1 | 10/2020 | Roberts et al. | |
| 2021/0027146 | A1* | 1/2021 | Xu | G06Q 30/0201 |
| 2021/0097078 | A1* | 4/2021 | Bhat | G06F 16/24537 |
| 2021/0149980 | A1* | 5/2021 | Pavlini | G06F 16/93 |

OTHER PUBLICATIONS

Wikipedia, "Beam Search," archived Nov. 3, 2019, 6 pages. (Year: 2019).*

Wikipedia, "A* Search Algorithm," archived Nov. 17, 2019, 25 pages (Year: 2019).*

Cheng, G. 2020. Relationship search over knowledge graphs. SIGWEB Newsl. 2020, Summer, Article 3 (Summer 2020), 8 pages. (Year: 2020).*

Xu, Zenglin & Sheng, Yongpan & He, Lirong & Wang, Yafang. (2016). Review on Knowledge Graph Techniques. Dianzi Keji Daxue Xuebao/Journal of the University of Electronic Science and Technology of China. (Year: 2016).*

Mohamed Yahya, et al. 2016. Relationship Queries on Extended Knowledge Graphs. In Proceedings of the Ninth ACM International Conference on Web Search and Data Mining (WSDM '16). Association for Computing Machinery, New York, NY, USA, 605-614. (Year: 2016).*

Enrique Noriega-Atala, Mihai Surdeanu, and Clayton Morrison. 2022. Learning Open Domain Multi-hop Search Using Reinforcement Learning. In Proceedings of the Workshop on Structured and Unstructured Knowledge Integration (SUKI), pp. 26-35, Seattle, USA. Association for Computational Linguistics. (Year: 2022).*

Zou, Xiaohan. (2020). A Survey on Application of Knowledge Graph. Journal of Physics: Conference Series. 1487. (Year: 2020).*

F. Kalloubi, E. H. Nfaoui and O. El Beqqali, "Named entity linking in microblog posts using graph-based centrality scoring," 2014 9th International Conference on Intelligent Systems: Theories and Applications (SITA-14), Rabat, Morocco, 2014, pp. 1-6. (Year: 2014).*

Asai, Akari & Hashimoto, Kazuma & Hajishirzi, Hannaneh & Socher, Richard & Xiong, Caiming. (2019). Learning to Retrieve Reasoning Paths over Wikipedia Graph for Question Answering. (Year: 2019).*

Godbole, A., et al., 2019. Multi-step Entity-centric Information Retrieval for Multi-Hop Question Answering. arXiv, Sep. 17, 2019, 6 pages. (Year: 2019).*

Großmann, B. et al., Improving Semantic Search through Entity-Based Document Ranking. In Proceedings of the 5th International Conference on Web Intelligence, Mining and Semantics (WIMS '15). Association for Computing Machinery, New York, NY, USA, Article 9, 1-12. (Year: 2015).*

Jensen, L., Saric, J. & Bork, P. Literature mining for the biologist: from information retrieval to biological discovery. Nat Rev Genet 7 119-129 (2006). (Year: 2006).*

Sheth, A., et al., Relationships at the Heart of Semantic Web: Modeling, Discovering, and Exploiting Complex Semantic Relationships. In: Nikravesh, M., Azvine, B., Yager, R., Zadeh, L.A. (eds) Enhancing the Power of the Internet. Studies in Fuzziness and Soft Computing, vol. 139. Springer (Year: 2004).*

Wang Y, Yao B, Wang T, Xia C, Zhao X. A Cognitive Method for Automatically Retrieving Complex Information on a Large Scale. Sensors (Basel). May 28, 2020;20(11):3057. (Year: 2020).*

Welbl, Johannes, Pontus Stenetorp and Sebastian Riedel. "Constructing Datasets for Multi-hop Reading Comprehension Across Documents." Transactions of the Association for Computational Linguistics 6 (2017): 287-302. (Year: 2017).*

* cited by examiner

MULTI-HOP SEARCH FOR ENTITY RELATIONSHIPS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to entity-based search and analysis, and more specifically to an unsupervised multi-hop search for entity relationships in a corpus of documents.

BACKGROUND

Entity-based search and analysis provide a useful semantic tool for machine and human interactions with a corpus of documents. However, the computational complexity of analyzing groups of documents to discover a relationship between two entities increases rapidly with the number of intermediate entities necessary substantiate the relationship. There remains a need for improved techniques to discover and substantiate multi-hop relationships between to entities in an entity-based system.

BRIEF DESCRIPTION OF THE DRAWINGS

The features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein. In the drawings, like reference numerals generally identify corresponding elements.

DETAILED DESCRIPTION

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, for example, the term "or" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms unless specifically stated to the contrary.

Figure 1:
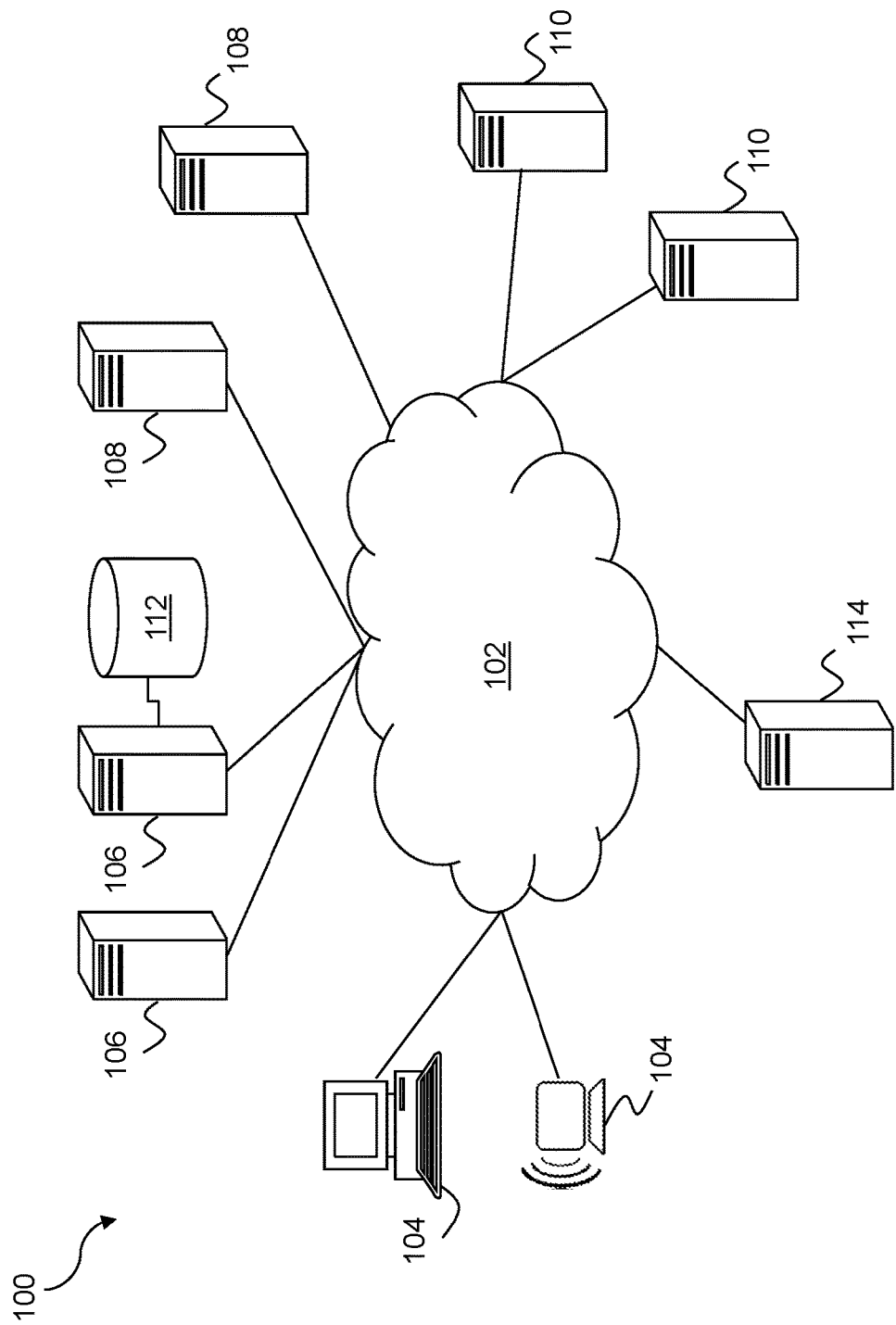
FIG. 1 shows a networked environment for entity-centric information retrieval and analysis.

FIG. 1 shows a networked environment for entity-centric information retrieval and analysis. In general, the environment 100 may include a data network 102 interconnecting a plurality of participating devices in a communicating relationship. The participating devices may, for example, include any number of client devices 104, servers 106, content sources 108, and other resources 110.

The data network 102 may be any network(s) or internetwork(s) suitable for communicating data and information among participants in the environment 100. This may include public networks such as the Internet, private networks, telecommunications networks such as the Public Switched Telephone Network or cellular networks using third generation (e.g., 3G or IMT-2000), fourth generation (e.g., LTE (E-UTRA) or WiMAX-Advanced (IEEE 802.16m)) and/or other technologies, as well as any of a variety of corporate area or local area networks and other switches, routers, hubs, gateways, and the like that might be used to carry data among participants in the environment 100.

Each of the participants of the data network 102 may include a suitable network interface comprising, e.g., a network interface card, which term is used broadly herein to include any hardware (along with software, firmware, or the like to control operation of same) suitable for establishing and maintaining wired and/or wireless communications. The network interface card may include without limitation a wired Ethernet network interface card ("NIC"), a wireless 802.11 networking card, a wireless 802.11 USB device, or other hardware for wired or wireless local area networking.

The network interface may also or instead include cellular network hardware, wide area wireless network hardware or any other hardware for centralized, ad hoc, peer-to-peer, or other radio communications that might be used to connect to a network and carry data. In another aspect, the network interface may include a serial or USB port to directly connect to a local computing device such as a desktop computer that, in turn, provides more general network connectivity to the data network 102.

The client devices 104 may include any devices within the environment 100 operated by users for practicing the entity-centric information retrieval and aggregation techniques as contemplated herein. Specifically, the client devices 104 may include any device for initiating and conducting searches, gathering information, drafting entity profiles, performing other research tasks, and so forth, as well as managing, monitoring, or otherwise interacting with tools, platforms, and devices included in the systems and methods contemplated herein. By way of example, the client devices 104 may include one or more desktop computers, laptop computers, network computers, tablets, mobile devices, portable digital assistants, messaging devices, cellular phones, smart phones, portable media or entertainment devices, or any other computing devices that can participate in the environment 100 as contemplated herein. As discussed above, the client devices 104 may include any form of mobile device, such as any wireless, battery-powered device, that might be used to interact with the networked environment 100. It will also be appreciated that one of the client devices 104 may coordinate related functions (e.g., searching, storing an entity profile, etc.) as they are performed by another entity such as one of the servers 106, content sources 108 or other resources 110.

Each client device 104 may generally provide a user interface, such as any of the user interfaces described herein. The user interface may be maintained by a locally executing application on one of the client devices 104 that receives data from, e.g., the servers 106 and content sources 108 concerning an entity. In other embodiments, the user interface may be remotely served and presented on one of the client devices 104, such as where a server 106 or one of the other resources 110 includes a web server that provides information through one or more web pages or the like that can be displayed within a web browser or similar client executing on one of the client devices 104. The user interface may in general create a suitable visual presentation for user interaction on a display device of one of the client devices 104, and provide for receiving any suitable form of user input including, e.g., input from a keyboard, mouse, touchpad, touch screen, hand gesture, or other use input device(s).

The servers 106 may include data storage, a network interface, and a processor and/or other processing circuitry. In the following description, where the functions or configuration of a server 106 are described, this is intended to include corresponding functions or configuration (e.g., by programming) of a processor of the server 106. In general, the servers 106 (or processors thereof) may perform a variety of processing tasks related to the entity-centric information retrieval and aggregation techniques discussed herein. For example, the servers 106 may manage information received from one or more of the client devices 104 and provide related supporting functions such as searching and the management of data. The servers 106 may also or instead include backend algorithms that react to actions performed by a user at one or more of the client devices 104. The backend algorithms may also or instead be located elsewhere in the environment 100.

The servers 106 may also include a web server or similar front end that facilitates web-based access by the client devices 104 to the capabilities of the server 106. A server 106 may also or instead communicate with the content sources 108 and other resources 110 in order to obtain information for providing to a user through a user interface on the client device 104. Where the user specifies search criteria such as search-type, language filters, relevance criteria (e.g., for determining relevance of a search result to an entity), confidence criteria (e.g., for determining whether a result relates to a particular entity), and the like, or search criteria is otherwise specified, e.g., through an action performed on an entity profile included on a client device 104, this information may be used by a server 106 (and any associated algorithms) to access other resources such as content sources 108 or other resources 110, to retrieve relevant or new information and re-rank search results. Additional processing may be usefully performed in this context such as recommending new search strategies to a user or recommending potentially new information to the user for addition to an entity profile.

A server 106 may also maintain a database 112 of content, along with an interface for users at the client devices 104 to perform searches and retrieval of database content using any of the techniques provided herein (e.g., automatically through an action performed on an entity profile). Thus, in one aspect, a server 106 (or any system including the server 106) may include a database 112 of entity information, and the server 106 may act as a server that provides a search engine for locating a particular attribute in the database 112, and providing supporting services such as retrieval of documents that are located.

In another aspect, the server 106 may support search activity by periodically searching for content at remote locations on the data network 102 and indexing any resulting content for subsequent search by a client 104. This may include storing location or address information for a particular document as well as parsing the document in any suitable manner to identify words, images, media, metadata and the like, as well as the creation of feature vectors or other derivative data to assist in similarity-type comparisons, dissimilarity comparisons, or other analysis. In one aspect, the database 112 may be manually curated according to any desired standards. The server 106 may provide or otherwise support an interface such as any of the interfaces described herein, which may be served to a user at a client 104.

A server 106 may also or instead be configured to track syndicated content or the like, such as by providing an interface for managing subscriptions to sources of content. This may include tools for searching existing subscriptions, locating or specifying new sources, subscribing to sources of content, and so forth. In one aspect, a server 106 may manage subscriptions and automatically direct new content from these subscriptions to a client device 104 according to input from a user. Thus, while it is contemplated that a client device 104 may autonomously subscribe to sources of content through a network interface and receive new content directly from such sources, it is also contemplated that this feature may be maintained through a remote resource such as a server 106. In one aspect, the server 106 may include a search engine or other host for any of the search engine algorithms, search techniques, data stores, or other algorithms, processing or the like described herein including without limitation entity-based search tools, grounded entity mention tools, recommendation engines, disambiguation processes, machine learning or machine analysis platforms, and so forth.

The content sources 108 may include any sources of data or information in any structured, semistructured or unstructured format capable of being utilized by the techniques described herein, e.g., to update or refine an entity profile being created by a user. For example, the content sources 108 may include without limitation Web pages (e.g., public or private pages), search engines or search services, interfaces to various search services, application program interfaces (APIs) to remote sources of data, local or remote databases (e.g., private databases, corporate databases, government databases, institutional databases, educational databases, and so forth), libraries, other online resources, social networks, computer programs and applications, other entity profiles, and so forth. The content sources 108 may include various types of information and data including without limitation textual information (e.g., published or unpublished information such as books, journals, periodicals, magazines, newspapers, treatises, reports, legal documents, reporters, dictionaries, encyclopedias, blogs, wikis, and so forth), graphical information (e.g., charts, graphs, tables, and so forth), images or other visual data (e.g., photographs, drawings, paintings, plans, renderings, models, sketches, diagrams, computer-aided designs, and so forth), audio data, numerical data, geographic data, scientific data (e.g., chemical composition, scientific formulas, and so forth), mathematical data, and so forth.

The other resources 110 may include any resources that may be usefully employed in the devices, systems, and methods as described herein. For example, the other resources 110 may include without limitation other data networks, human actors (e.g., programmers, researchers, annotators, editors, and so forth), sensors (e.g., audio or visual sensors), text mining tools, web crawlers, knowledge base acceleration (KBA) tools or other content monitoring tools, and so forth. The other resources 110 may also or instead include any other software or hardware resources that may be usefully employed in the networked applications as contemplated herein. For example, the other resources 110 may include payment processing servers or platforms used to authorize payment for content subscriptions, content purchases, or otherwise. As another example, the other resources 110 may include social networking platforms that may be used, e.g., to share an entity profile or other research conducted by a user, or as additional sources of entity information. In another aspect, the other resources 110 may include certificate servers or other security resources for third party verification of identity, encryption or decryption of content, and so forth. In another aspect, the other resources 110 may include a desktop computer or the like co-located (e.g., on the same local area network with, or directly coupled to through a serial or USB cable) with one of the client devices 104. In this case, the other resource 110 may provide supplemental functions for the client device 104. Other resources 110 also include supplemental resources such as scanners, cameras, printers, and so forth.

The environment 100 may include one or more web servers 114 that provide web-based access to and from any of the other participants in the environment 100. While depicted as a separate network entity, it will be readily appreciated that a web server 114 may be logically or physically associated with one of the other devices described herein, and may, for example, include or provide a user interface for web access to one of the servers 106 (or databases 112 coupled thereto), one of the content sources 108, or any of the other resources 110 in a manner that permits user interaction through the data network 102, e.g., from a client device 104.

It will be understood that the participants in the environment 100 may include any hardware or software to perform various functions as described herein. For example, one or more of the client device 104 and the server 106 may include a memory and a processor.

The various components of the networked environment 100 described above may be arranged and configured to support the techniques described herein in a variety of ways. For example, in one aspect, a client device 104 connects through the data network 102 to a server 106 that performs a variety of processing tasks related to entity-centric information retrieval and aggregation. For example, the server 106 may host a website that runs an entity-centric information retrieval and aggregation program where a user builds an entity profile that is used as a query for searching, retrieving, and ranking information related to the entity. In this manner, as a user builds the entity profile on an interface displayed on the client device 104, the server 106 may update a search for new and pertinent information related to the entity profile using the content sources 108, other resources 110, or database 112. As discussed in more detail below, the server 106 (or another participant in the environment 100) may include one or more algorithms that define the search and allow the server 106 to react to actions taken on the entity-centric information retrieval and aggregation program, such as revisions made to the entity profile or the selection of information. More generally, aspects of the search, processing, and presentation of information as described herein may be distributed in any suitable manner. For example, the search functions, e.g., of a search engine, may be distributed among one or more servers that locate and process documents, and among a client device, which may, e.g., locally parse queries within a user interface, transmit requests for information to a remote search engine, present results from a search engine, or otherwise participate in the various search, processing, and display of information and other functions described herein. Similarly, where documents on a local device or a cloud storage facility are included within a search, the search engine may be deployed in a distributed fashion or otherwise provided with access to document repositories of interest.

Figure 2:
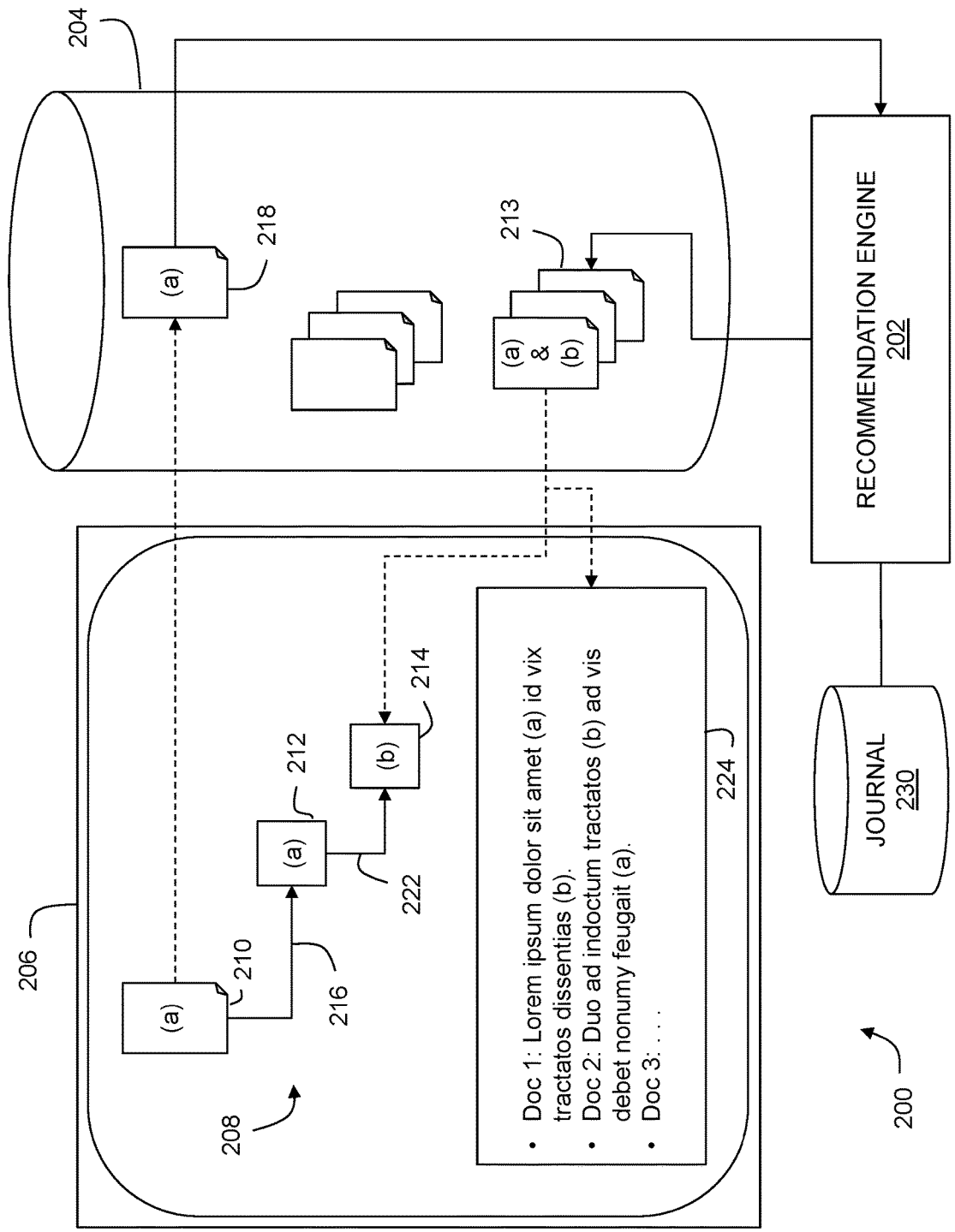
FIG. 2 shows a system for entity-based analysis and recommendations.

FIG. 2 shows a system for entity-based analysis and recommendations. In particular, a recommendation engine 202 may provide recommendations concerning, e.g., related documents and concepts from a corpus of documents 204, to a human user in a user interface 206 based on user interactions.

The user interface 206 may, for example, include any display, interface device, interface component, or the like suitable for displaying content such as a knowledge graph 208 to a human user and receiving input such as graphical interface input, text input, and so forth from the human user. This may, for example, include a display for any of the client devices described above. In general, the knowledge graph 208 may include one or more documents represented in the user interface 206 by document icons, along with one or more concepts represented in the user interface 206 by concept icons. To form the knowledge graph 208, these documents and concepts may be associated through relationships such as graph edges that are represented as visual indicators of mentions within the user interface 206. As depicted, the user interface 206 rendered in a display may include a document icon 210, a first concept icon 212, and a first visual indicator 216. The document icon 210 may, for example, be associated with a first document 218 in the corpus of documents 204, which may be stored, for example, in a single database or data store, or distributed across a data network or other distributed environment and indexed as appropriate for identification through a search engine or the like. It will be appreciated that, while depicted separately from the user interface 206, the first document 218 and one or more other documents in the corpus of documents 204 may be located on a device that hosts and controls the user interface 206. The documents may also or instead be remote from the device, or some combination of these.

It should be appreciated that, while the knowledge graph 208 is referred to herein as a suitable manner of visually presenting information, any other visual expression of the corresponding data may also or instead be used. For example, as described herein, user and machine interactions with a visual expression such as the knowledge graph 208 are recorded in a journal of operations that serves as a data repository for related activity. While the records in the journal of operations may be aggregated to create a knowledge graph 208 for presentation to a user, the records may also or instead be aggregated to create any other suitable visual expression of a project represented by the journal of operations. Thus, for example, where the text refers to a knowledge graph 208 as a matter of convenience, it should be understood that the text is also intended to refer to other visual expressions such as the summary cards and mention highlights described below, as well as any other visual expressions suitable for presenting an organization of information to a user and/or receiving user input related to such information.

In general, the first concept may be mentioned in the first document 218, as represented by the first visual indicator 216 associating the first concept icon 212 with the document icon 210 in the user interface 206. The user interface 206 may be configured to automatically, or in response to a user request, identify other documents in the corpus of documents 204 that also mention the first concept, designated generally as (a) in FIG. 2. The recommendation engine 202 may either automatically or in response to an explicit user request, identify documents 213 in the corpus of documents that identify the first concept, (a) and a second concept, (b), and then to recommend the second concept, (b) for inclusion in the knowledge graph 208. In general, the recommendation engine 202 may automatically create a second concept icon 214 identifying the second concept, along with a second visual indicator 222 to visually associate the first concept icon 212 with the second concept icon 214 in the user interface 206. The recommendation engine 202 may also or instead identify the candidate relationship and communicate the relationship to an agent executing locally on the device hosting the user interface 206, and the agent can determine how best to configure and display the visual indicator and/or icon. It will also be understood that the recommendation engine 202 may automatically populate the knowledge graph 208 within the user interface 206, or a candidate document, concept, or relationship may be presented to a user through the user interface 206 so that the user can accept, reject, modify, or request clarification of the proposed addition.

The recommendation engine 202 may also provide a variety of supporting information for any proposed additions. For example, the recommendation engine 202 may create a ranked list 224 of the plurality of other documents 213 (that contain mentions of (a) and (b)) and transmit the ranked list 224 to the device for presentation in the display, e.g., in the user interface 206. This may include snippets, content excerpts, or the like, e.g., that substantiate the relationship between (a) and (b), or the mention either of both of the corresponding concepts within the document(s). A variety of ranking techniques may be used to select and order the documents in the ranked list 224, as discussed for example, below.

The system 200 may include a journal of operations 230 that generally stores a record of human user interactions and machine user interactions with entity-based data. The journal of operations 230 may be updated, e.g., as the knowledge graph 208 is shared, edited, interacted with, used as context for further recommendations. Thus, for example, the system 400 may be configured to support iterative creation of the knowledge graph 208, with interactions and changes from various human and machine users stored in the journal of operations 230, from which data may be used to express accumulated information in the knowledge graph 208. Thus, the journal of operations 230 and the knowledge graph 208 are generally extensible, and may further be shared with other users to provide a platform for collaborative knowledge discovery.

Further details of an entity-centric system are provided by way of non-limiting example in commonly-owned Int'l App. No. PCT/US2019/039051 filed on Jun. 25, 2019 and entitled "SYSTEMS AND METHODS FOR INVESTIGATING RELATIONSHIPS AMONG ENTITIES," the entire content of which is hereby incorporated by reference. In one aspect, the recommendation engine 202 may search for and identify relationships among entities using an unsupervised multi-hop search technique as further described herein. While this technique may be deployed in response to a user input of two entities, e.g., through the user interface 206, it will be understood that the techniques described herein may also or instead be used in automated, entity-centric search, exploration, and analysis of a corpus of documents.

Figure 3:
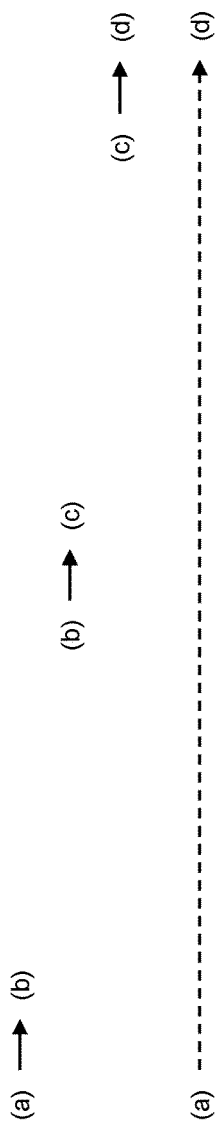
FIG. 3 illustrates a number of entity relationships.

FIG. 3 illustrates a number of entity relationships within documents in a corpus of documents. These relationships may, for example, be identified or substantiated by mentions within text of the documents, such as co-mentions of two different entities within a sentence or adjacent sentences in one of the documents. A relationship between entities (a) and (b) may be substantiated based on document 1 alone. In this case, a multi-hop search strategy is not generally required, and an automated process may, upon identifying the co-mention, provide the surrounding text as substantiation of the relationship without further multi-document processing.

However, if a user requests substantiation of a relationship between entity (a) and entity (c), supporting information may not be present in document 1 alone. In this case, multi-hop evidence of the relationship may be found in a combination of document 1, which co-mentions entity (a) and entity (b) ((a)→(b)) and document 2, which co-mentions entity (b) and entity (c) ((b)→(c)). Similarly multi-hop evidence of a relationship between entity (a) and entity (d) may be found in a chain of co-mentions from entity (a) and entity (b) in document 1, entity (b) and entity (c) in document 2, and entity (c) and entity (d) in document 3. It will be understood that, while these co-mentions are illustrated as mentions within a single sentence, co-mentions may more generally include mentions in adjacent sentences or other surrounding text, depending on the rules and metrics used to identify co-mentions.

The first relationship (between entity (a) and entity (b)) may be found by locating and processing the text within documents that mention (a) and (b). However, the computational challenge grows rapidly (e.g., exponentially) in size and complexity when searching for a relationship between entity (a) and entity (c), and this difficulty continues to multiply when substantiation of the relationship requires two or more hops between documents (e.g., from entity (a) to entity (d)). This problem is compounded further by co-reference, e.g., where a single entity has multiple identifiers, some of which may be ambiguous. For example, the term Ford may refer to a former president, a historical figure, an automobile, an automobile manufacturer, and so forth. As a significant advantage, the multi-hop search strategy described herein facilitates the identification and substantiation of multi-hop entity relationships based on a combination of pre-selection based on measures of graph centrality to manage computational complexity, and an A* search algorithm and beam search algorithm for thorough graph traversal while retaining only promising relationship paths in order to better manage memory requirements.

Figure 4:
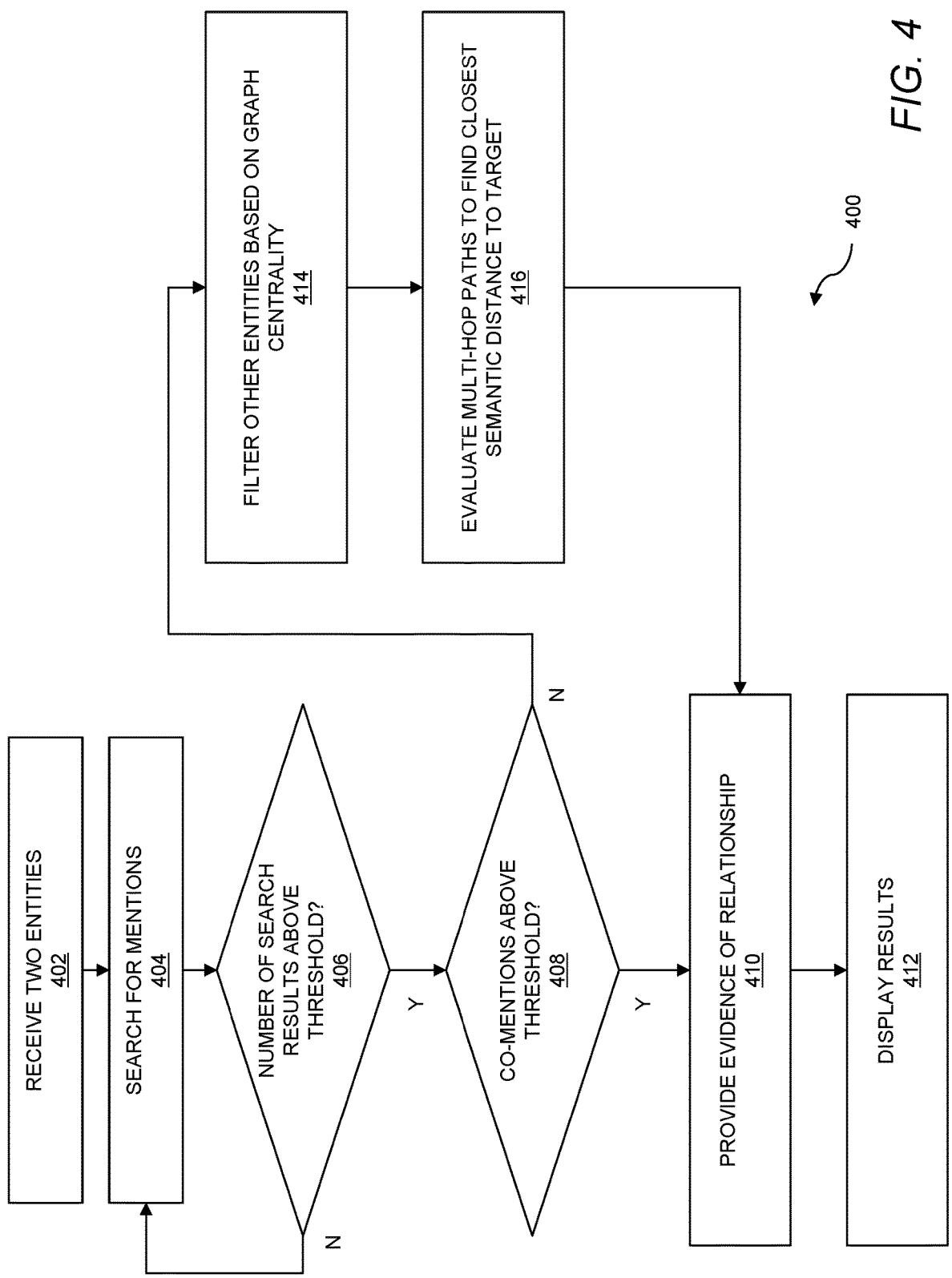
FIG. 4 shows a flow chart of a method for a multi-hop search for entity relationships across a corpus of documents.

FIG. 4 shows a flow chart of a method for a multi-hop search for entity relationships across a corpus of documents. In general, when a relationship between two entities cannot be substantiated by co-mentions within a single document, a multi-hop search strategy may be deployed to identify one or more intermediate entities through which the relationship can be substantiated, e.g., through a multi-hop chain of co-mentions through a number of documents. It will be understood that the method 400 described herein may usefully be performed within the context of an entity-based system or environment, e.g., to support entity identification, co-reference resolution, disambiguation, and so forth.

As shown in step 402, the method 400 may begin with receiving an identification of two entities for which a relationship is sought. This may include, e.g., receiving a selection of the two entities—a first entity and a second entity—from a user in a user interface such as any of the user interfaces described herein, or this may include receiving the selection through a programming interface or the like from an automated agent engaged in entity exploration or some other programmatic source. It will be appreciated that, for an existing entity-centric database or system, a relationship between the two entities may already be known. In this case, no further searching is required and the relationship and/or substantiating evidence may be displayed graphically or textually within a user interface, or otherwise returned to a requestor.

As shown in step 404, the method 400 may include searching for mentions of the two entities within a corpus of documents. In general, the search engine for these searches may perform a keyword search across the corpus of documents, an entity-based search across the corpus of documents, or any other semantic or literal search useful for identifying the entities. It will also be appreciated that the search engine for these searches may be hosted on a server that is performing the steps of the method 400, or the search engine may be a remote resource or the like. In the latter case, searching for mentions may generally include causing a search of a corpus of documents at the remote search resource, e.g., to obtain a search result including a plurality of documents each mentioning at least one of the two entities or interest. In the context of an entity-based system, this may also include searches for entity co-references or the like in order to assist in locating relevant entity mentions that use different labels, formats, or identifiers. For natural language systems, this may include calculating embeddings to identify similar terms or concepts. For keyword-based searching, this may include the use of a thesaurus or similar device to match other terms used to identify the entity of interest. These and other techniques may be used either alone or in combination to facilitate the identification of documents containing relevant mentions.

As shown in step 406, the search results may be evaluated to determine if the number of results is above a predetermined threshold. If insufficient results are obtained, e.g., to perform a meaningful analysis, the search requestor may be notified and/or the search parameters may be revised and broadened in order to locate additional responsive documents within the corpus of documents and the method 400 may return to step 404. That is, the method 400 may include, when the search result includes a number of results below the predetermined threshold, revising the search request against the corpus of documents and returning to step 404. In this context, the threshold may be any number of documents necessary or desirable for subsequent processing as described herein. This may be, e.g., 5, 10, 20, or 100 documents, or any other empirically or analytically developed threshold for further processing, and may depend on the particular entities selected, the size of the corpus of documents, the number of hops to be analyzed, and so forth. If an adequate number of search results are found, then the method 400 may proceed to step 408.

As shown in step 408, the method 400 may include determining whether the number of co-mentions of the two entities are above a predetermined threshold. In general, this threshold test detects the degenerate case where sufficient evidence of a relationship can be found in one or more documents that co-mention the two entities of interest. This step may more specifically include identifying a subset of the plurality of documents in the search result that contain a co-mention of both of the two entities, and in response to determining that a number of documents in the subset is above a predetermined threshold, identifying a relationship between the two entities based on text in the document(s) belonging to the subset. In this case, the method 400 may proceed to step 410 where evidence of the relationship is provided. Alternatively, in response to determining that the number of documents in the subset is below the predetermined threshold, the method 400 may include initiating a multi-hop search within the plurality of documents for the relationship between the two entities through a third entity, e.g., a third entity co-mentioned with at least one of the first entity and the second entity in one or more of the plurality of documents, starting with step 414. In general, the threshold for the number of documents may be any number and may depend on the strength of the substantiating evidence, the semantic or textual distance between the co-mentions, and so forth. The threshold may be as low as a single document, or any other suitable number.

As shown in step 410, the method 400 may include providing evidence of the relationship between the two entities. Where the evidence is based on co-mentions within a single document, this may include a document identifier and/or snippet of text containing the co-mention. Where the evidence is based on a multi-hop relationship through a third entity, the evidence may include an identifier for the third entity and one or more segments of text substantiating a supporting co-mention of the third entity and one of the other two entities.

As shown in step 412, the method 400 may include displaying results or otherwise processing the relationship and other output from the method 400. In one aspect, this may include adding the relationship to the journal of operations described above, and/or creating a knowledge graph for display in a user interface showing the relationship among the two entities and the third entity. This may also or instead include updating an existing knowledge graph containing the first entity and the second entity to include the relationship. Displaying the results may also include displaying the knowledge graph including the relationship to a user through a user interface such as any of the user interfaces described herein.

In a graphical presentation such as the knowledge graph, the relationship may be represented as a direct relationship between the first entity and the second entity, with the graph edge that represents the relationship further providing interactive access to supporting evidence for the relationship through the third entity. In another aspect, the relationship may be graphically represented as an indirect relationship between the first entity and the second entity through the third entity, e.g., by adding a new node for the third entity, and two edges connecting the third entity to the first entity and the second entity. These graphical representations may be expanded as appropriate to include a fourth entity, a fifth entity, and so on, to accommodate the chain of co-mentions evidencing the relationship between the first entity and the second entity.

Returning to step 408, if the number of co-mentions of the first entity and the second entity is below a predetermined threshold, the method 400 may include initiating a multi-hop search strategy for a relationship between the first entity and the second entity through one or more other entities and documents. In general, this multi-hop search strategy may include searching for the relationship through a plurality of intermediate entities forming a chain of co-mentions including text that substantiates the relationship for each intermediate step between the first entity and the second entity. A variety of semantic and entity-based tools may be used to locate entity mentions spanning multiple documents, and to identify co-mentions within these multiple documents bridging the relationship gap between the first entity and the second entity. For example, a brute force approach may parse all entities and multi-entity co-mentions. However, this may quickly exhaust available computational and memory resources, as the problem scales exponentially with a number of different parameters including the number of documents in the search result and the number of hops required to find a relationship. As an alternative, an A* graph traversal using word embeddings to evaluate semantic distance provides a useful tool for evaluating whether various paths and relationships are closing the semantic gap with a target entity, and a beam search algorithm can be used to more efficiently synthesize results from different paths through documents, entities, and entity co-mentions by retaining only more promising paths. The word embeddings may, for example, use an average of universal sentence embeddings from the documents mentioning each entity, e.g., the average of each sentence that the entities were mentioned in, or any other sentence or text embedding useful for estimating semantic distance.

In general, a variety of techniques may be used to support a multi-hop search strategy and evaluate semantic distance between the two entities and intermediate entities. As described herein, three specific tools can yield a thorough and computationally efficient technique for locating relationships: pruning candidate entities based on heuristics such as graph centrality, A* graph search, and beam search algorithms.

As shown in step 414, the method 400 may include initiating a multi-hop search strategy by filtering entities within the corpus of documents based on graph centrality. Conceptually, this step aims to identify entities that are highly important or central to relationship graphs within the corpus of documents in order to avoid extensive processing of marginal entities. More specifically, this may include ranking one or more additional entities co-mentioned in the plurality of documents with a first one of the two entities based on graph centrality over normalized entity identifiers. The normalized entity identifiers may be captured in an embedded space or any other suitable model or the like to account for coreferences using different labels or identifiers. A variety of analytic tools are available for calculating graph centrality including, e.g., degree centrality, closeness centrality, betweenness centrality, eigenvector centrality, and so forth. In one aspect, a text rank model, similar to the web-oriented Page Rank model but applied to entities, may be used to provide a fully unsupervised and untrained model for locating entities mentioned within the same sentence as one of the two target entities. In general, one or more additional entities in a set of the highest ranked entities located using the text rank model (or any other suitable model or algorithm for evaluating graph centrality) may be further analyzed in an effort to locate multi-hop paths between the two entities. By pruning the candidate entities in this manner, the size and complexity of the subsequent analysis can be significantly reduced.

As shown in step 416, the method 400 may include evaluating multi-hop paths to find a closest semantic distance from a starting entity (e.g., the first of the two entities) to a target entity (e.g., the second of the two entities).

In one aspect, text embedding provides a useful figure of merit for semantic distance from a current candidate for a third entity to a target entity such as one of the two entities in the initial request. In general, a text embedding provides a natural language modeling technique where words or phrases from a vocabulary are mapped to vectors of real numbers. In this continuous vector space, the distance between two words depends on the similarity in meaning, which provides a useful tool for objectively evaluating distance from one named entity to another. The text embedding may, for example, use a universal text embedding for natural language processing. A variety of universal text embeddings are commercially available including text embeddings trained, e.g., on Wikipedia content, general web-content, and so forth. In another aspect, the text embedding may be a propriety text embedding created, e.g., based on a particular user's corpus of documents or on documents from a particular knowledge domain of interest. More generally, any text embedding providing a tool for measuring semantic similarity as contemplated herein may also or instead be used. It will be appreciated that other measures of semantic similarity are also known in the art including measures of topological similarity, statistical similarity, and semantics-based similarity, any of which may be adapted for use in objectively measuring semantic distance as contemplated herein.

In general, text embeddings may be weighted using any suitable parameters. For example, an embedding may be calculated as a multiplicative combination of any number of factors such as, e.g., a frequency or number of mentions (or a logarithmically scaled version of the frequency), a root mean square of centrality (e.g., to boost highly relevant/central entities), and an empirical tuning constant.

In another aspect, an A* graph search provides a useful analytical technique for estimating the semantic distance between the two entities through various potential traversals of documents and entity co-mentions. In general, an A* graph search provides a technique for starting at a specific node in a graph and evaluating a tree of possible paths to find a path to the objective having a smallest cost. More specifically, the algorithm extends available paths one node at a time and at each point, evaluates the cost from a starting point to the node and an estimated cost from the current node to the objective. For example, in the current context, the cost from the starting point is known, and the estimated cost to the objective may be based on a calculation of a semantic distance between the entity at the current node and the target entity. The A* graph search may use the text embedding to estimate this distance. That is, the A* search may calculate a semantic distance to a target (e.g., the second entity) based on a text embedding of the target and one or more top ranked ones of the one or more additional entities above. More generally, the multi-hop search for the relationship between the two entities may include evaluating a semantic distance to one of the two entities by calculating a sentence embedding using an embedding model trained for natural language processing, or any other text embedding suitable for estimating distance between entities as contemplated herein.

The A* graph search may usefully employee a truncated document space. While an A* graph search is typically applied in a context where specific directions or locations are known (e.g., maze finding, traveling salesperson problems), there may be no equivalent directionality available in an entity-based search spanning multiple documents. While semantic distance provides an estimate of distance, this does not provide a direction to the endpoint that will necessarily be reached. In order to address this challenge, the A* graph search may be adapted to be forcibly limited to a number of nodes or hops by truncating the document space of each search, e.g., by limiting the number of other nodes or entities that are examined to those that are most central to the graph space or otherwise estimated to be most important or productive to the intended result.

In another aspect, the multi-hop search for a relationship between the two entities may include a beam search algorithm for iteratively evaluating semantic distances. In general, a beam search is a heuristic graph search algorithm. The beam search generally explores a graph in a best-first search that reduces memory requirements by ordering all partial solutions or states according to some heuristic, and then retains only a predetermined number of best partial solutions as candidates. This approach continuously measures new, partial results, against the highest ranked (e.g., retained) partial results from prior searches in order to aggregate the best overall results for further exploration. The beam search algorithm may be used to limit graph traversal to the best available paths known at the time, e.g., those containing the most important entities in each document (based on graph centrality) that are available for evaluation. Thus, the method 400 may include iteratively evaluating the one or more additional entities with a beam search algorithm while using the A* graph search to calculate a distance from the first one of the two entities to a second one of the two entities.

Based on the foregoing, the method 400 (e.g., at step 416) may include determining an entity from the one or more additional entities that provides a smallest value for the distance from the first one of the two entities to the second one of the two entities and selecting this entity as the third entity. This may be objectively captured or represented, e.g., as a relevant co-mention of one of the intermediate entities within a sentence or two of the target entity. With the third entity thus identified, along with supporting text, the method 400 may proceed to step 410 where evidence of the relationship is provided, and to step 412 where information is displayed or otherwise processed as desired. It will be understood that the A* graph analysis and beam search permit concurrent scoring of different paths with different lengths. Thus, the best score(s) may include one hop, two hops, or more hops, which may be scored and compared side by side. As a result, while the foregoing description emphasizes a third entity that bridges the relationship between a first entity and a second entity, this conceptual bridge may include a fourth entity, a fifth entity, and so on depending on the manner in which the graph traversal converges on the target entity.

According to the foregoing, there is also described herein a system including a server, a memory on the server, and a processor. The server may be coupled in a communicating relationship with a network, e.g., to access remote resources such as documents and search engines, and to provide access by users to functions of the server. The memory may generally store computer executable code to configure the processor, as well as user data, search results, intermediate processing data, entity information, and so forth as necessary or helpful, e.g., for the method 400 described above. The processor may be configured by the computer executable code to provide a user interface for receiving a selection of two entities including a first entity and a second entity from a user over the network, the process further configured by the computer executable code to cause a search of a corpus of documents to obtain a search result including a plurality of documents each mentioning one or more of the two entities, to identify a subset of the plurality of documents where each document in the subset contains a co-mention of both of the two entities, in response to determining that a number of documents in the subset is below a predetermined threshold, to initiate an unsupervised multi-hop search for a relationship between the two entities through a third entity co-mentioned with at least one of the first entity and the second entity in one or more of the plurality of documents, and in response to locating the relationship between the two entities through the third entity, to present to the user through the user interface an identifier for the third entity and one or more segments of text substantiating the relationship with a supporting co-mention of the third entity and at least one of the two entities. In one aspect, the system may further include a database storing the corpus of documents used by the processor.

Figure 5:
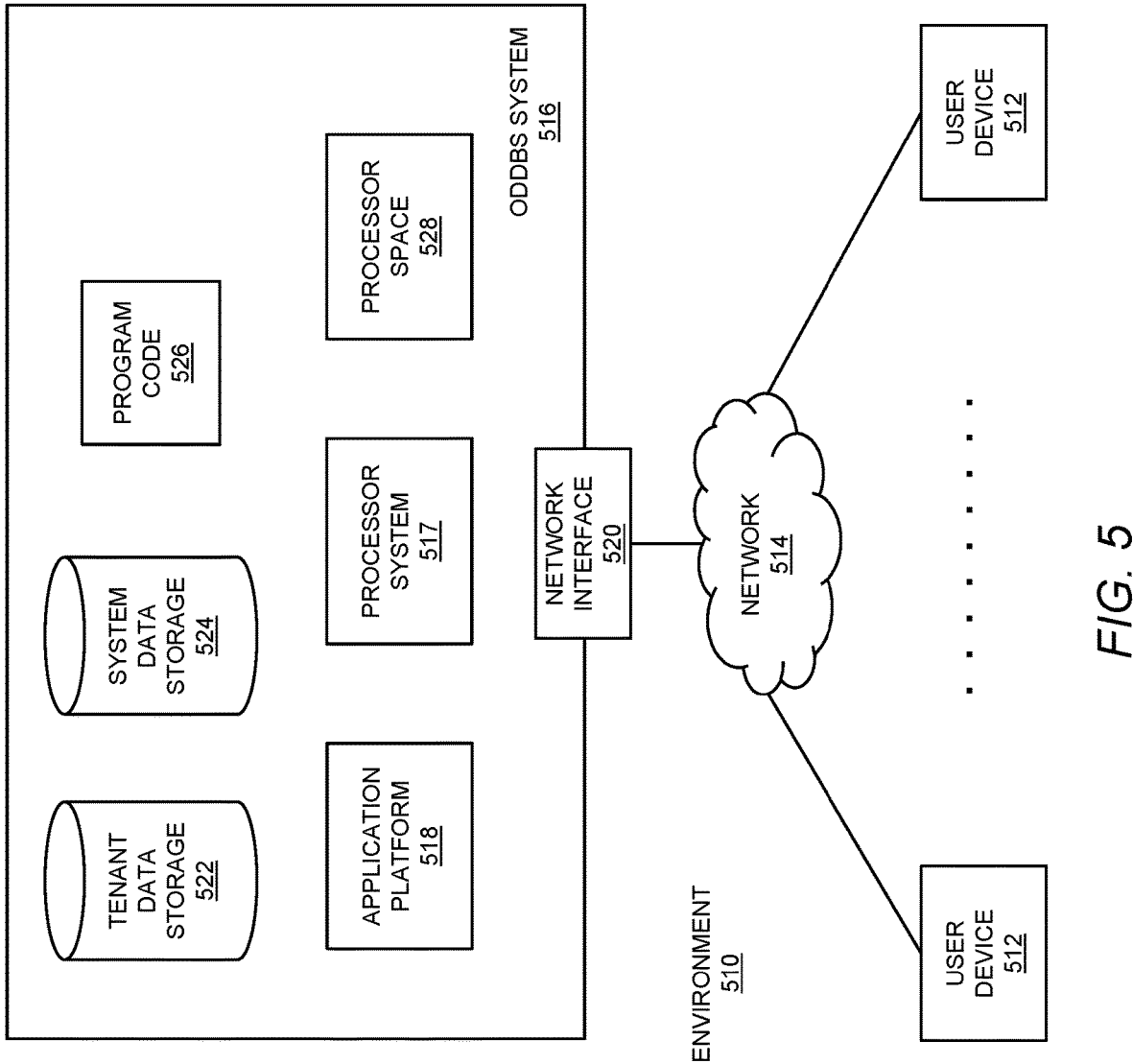
FIG. 5 shows a block diagram of an example of an environment wherein multi-hop entity search may be used.

FIG. 5 illustrates a block diagram of environment 510 of an on-demand database service. While environment 510 illustrates an on-demand database service, the one or more implementations and techniques described herein are not limited to environment 510. For instance, embodiments may be implemented on other computing systems such as laptop, a tablet, a PDA, a desktop computer, a mobile device, a network system such as a LAN, a WAN, etc. Embodiments may also be practiced in other ways without departing from the scope of the embodiments.

Returning to FIG. 5, environment 510 may include one or more user devices 512, network 514, on-demand database service (ODDBS) 516, processor system 517, application platform 518, network interface 520, tenant data storage 522, system data storage 524 for system data 525 accessible by ODDBS 516, program code 526 for implementing various functions of ODDBS 516, and processor space 528. In some embodiments, environment 510 may have other or different elements in addition to those listed above. In some embodiments, two or more of the elements discussed with respect to environment 510 may be combined into a single element. In some embodiments, one or more of the elements may be split into two or more separate elements within environment 510.

Figure 6:
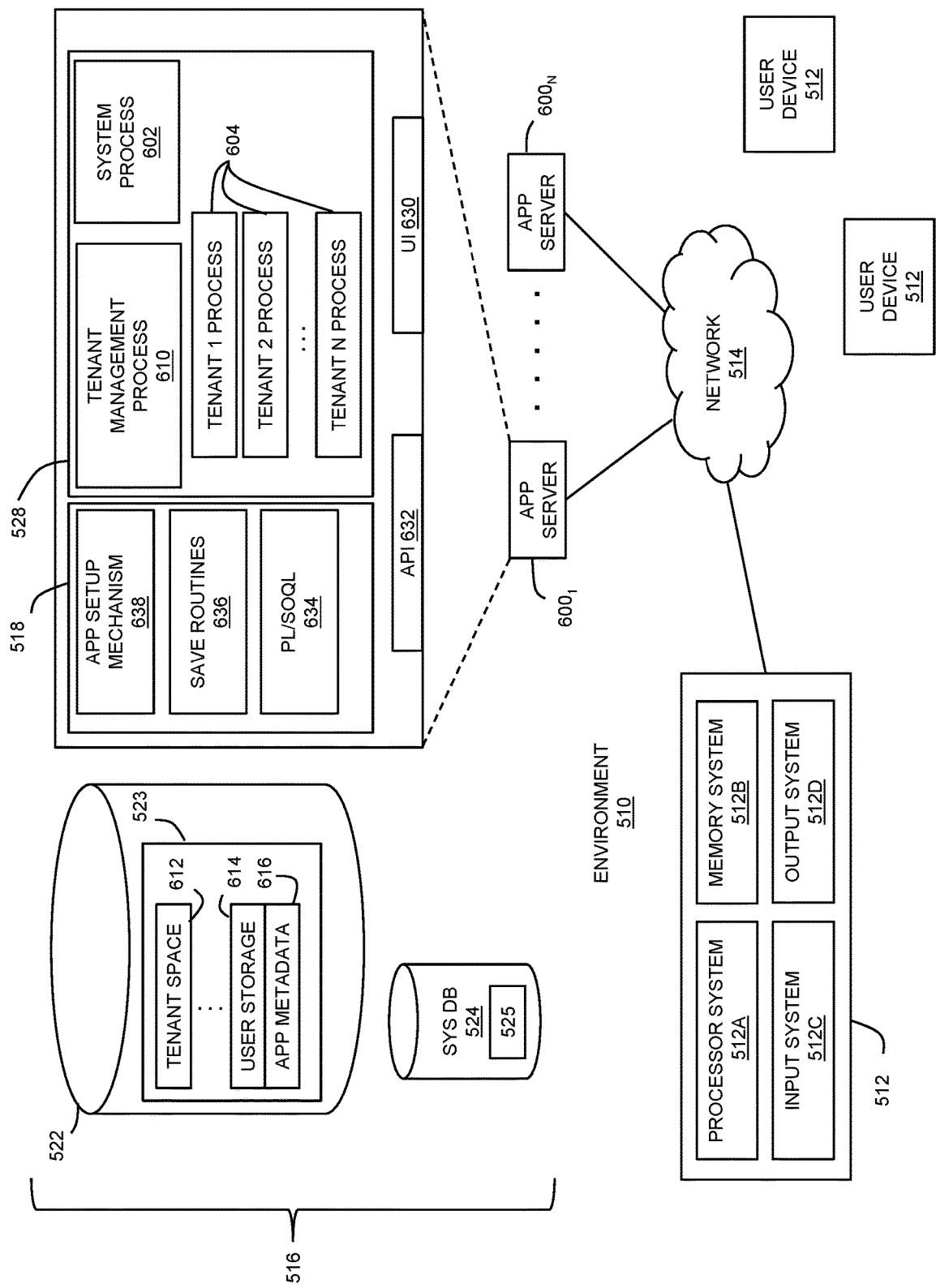
FIG. 6 shows a block diagram of an embodiment of elements of FIG. 5 and various possible interconnections between these elements.

User device 512 may be any machine or system used to access a database server. User device 512 can include a handheld computing device, a mobile phone, a laptop computer, a workstation, and a network of computing devices. An ODDBS 516 may be available for outside users when they need the database system. As illustrated in FIG. 5 and FIG. 6, user device 512 may interact via network 514 with ODDBS 516.

In some embodiments, ODDBS 516 may store information from one or more tenants in tables of a common database to form a multi-tenant database system (MTS). A relational database management system (RDMS) or the equivalent may execute storage and retrieval of information against the database object(s) stored in the database. Application platform 518 is a framework that enables ODDBS 516 providers, user device 512 users, or third party application developers to create, manage or execute one or more applications on the ODDBS 516.

Administrators of the ODDBS 516 may determine different permission levels for users of user devices 512 based on roles and privileges. For example, a salesperson using a particular user device 512 to interact with ODDBS 516 has the capacities allotted to that salesperson. An administrator using user device 512 to interact with ODDBS 516 has the capacities allotted to that administrator.

Network 514 is any network or combination of networks of devices that communicate with one another. For example, network 514 can be any one or any combination of a LAN, WAN, telephone network, wireless network, or other configurations. A TCP/IP network is an example network system that implements embodiments. Some implementations might use protocols other than TCP/IP, such as a UDP, IPX/SPX, AppleTalk, ICMP, etc.

User devices 512 may communicate with ODDBS 516 using application protocols such as HTTP. User device 512 may run a browser, such as an HTTP client, enabling a user to access, process and view information, pages, and applications via network 514. For example, the browser can be used to access data and applications hosted by ODDBS 516, and to perform searches on stored data, and otherwise allow a user to interact with various GUIs. In other embodiments, native applications operating on user devices 512 may be used as user interfaces to the ODDB S 516.

In one embodiment, ODDBS 516 implements a customer relationship management (CRM) system that includes application servers configured to implement CRM software applications. An MTS may store data for multiple tenants in the same physical database. However, data of different tenant typically are logically separate so that one tenant does not have access to another tenant's data, unless such data are expressly shared. In certain embodiments, ODDBS 516 implements applications other than a CRM application. Additional processes that may execute on ODDBS 516 include database indexing processes.

User device 512 and all of its components may be operator configurable using applications running on a CPU. Similarly, ODDB S 516, all of its components, and additional instances of an MTS might be operator configurable using applications executed by processor system 517. A computer program product embodiment includes a machine-readable storage medium having instructions stored thereon/in that can be used to program a computer to perform any of the embodiments' processes. Computer code for implementing embodiments in any programming language such as Java™, Apex®, C++, etc.

In an embodiment, the ODDBS 516 is configured to provide webpages, forms, applications, data, and media content to user device 512 to support access by tenants of ODDB S 516. As such, ODDBS 516 provides security mechanisms to keep each tenant's data separate unless the data are shared. If more than one server within the ODDBS 516 is used, those servers may be in close proximity or distributed across geographical locations. As used herein, each MTS can include one or more logically and/or physically connected servers distributed locally or across one or more geographic locations. Similarly, the database object described herein can be implemented as single databases, a distributed database, a collection of distributed databases, a database with redundant online or offline backups or other redundancies, etc., and might include a distributed database or storage network and associated processing intelligence.

FIG. 6 further illustrates elements of system 510. User device 512 may include processor system 512A, memory system 512B, input system 512C, and output system 512D. ODDBS 516 may include tenant data storage 522, tenant data 523, system data storage 524, system data 525, User Interface (UI) 630, Application Program Interface (API) 632, PL/SOQL 634, save routines 636, application setup mechanism 638, applications servers 10001-1000N, system process space 602, tenant process spaces 604, tenant management process space 610, tenant storage area 612, user storage 614, and application metadata 616. In other embodiments, ODDBS 516 and/or user device 512 may not have the same elements as those listed above and/or may have other elements instead of, or in addition to, those listed above.

In FIG. 6, ODDBS 516 may include application servers 600. System process space 602 includes individual tenant process spaces 604 and a tenant management process space 610. The tenant data 523 might be divided into individual tenant storage areas 612, which can be either a physical arrangement or a logical arrangement of data. A UI 630 provides a user interface and an API 632 provides application programming interface to users and developers at user devices 512.

Application platform 518 includes an application setup mechanism 638 that supports application developers' creation and management of applications. Applications may be saved as metadata into tenant data storage 522 by save routines 636 for execution by subscribers as one or more tenant process spaces 604 managed by tenant management process 610. Invocations to such applications may be coded using PL/SOQL 34 that provides a programming language style interface extension to API 632. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations of applications may be detected by one or more system processes 602, which manage retrieving application metadata 616 for the subscriber making the invocation and executing the metadata as an application.

Application servers 600 may communicate with database systems via different network connections such as the Internet, direct network links. TCP/IP is the typical protocol for communicating between application servers 600 and the database systems. However, other transfer protocols, such as those mentioned above, may be used to optimize the network connection.

In certain embodiments, each application server 600 is configured to handle requests for any user associated with any organization that is a tenant. Preferably, a user or an organization has no server affinity for a specific application server 600i. In one embodiment, a load balancer is communicably coupled between the application servers 600 and the user devices 512. In this manner, ODDBS 516 is multi-tenant and handles storage of, and access to, different objects, data and applications across disparate users and organizations.

As an example of the use of ODDBS 516, one tenant might be a company that employs a sales force where each salesperson uses ODDBS 516 to manage their sales process. A user might maintain contact data, leads data, customer follow-up data, performance data, goals and progress data, etc., in tenant data storage 522. In an MTS arrangement, the user can manage his or her sales efforts and cycles from any of many different user systems.

While each user's data might be separate from other users' data, some data might be organization-wide and is shared or accessible by a plurality of users. Thus, some data in ODDB S 516 are managed at the tenant level while other data are managed at the user level. The MTS has security protocols that keep data, applications, and application use separate. ODDBS 516 might also maintain system level data usable by multiple tenants or other data, such as industry reports, news, and postings sharable among tenants. Also, the MTS can implement redundancy, up-time, and backup functions.

In certain embodiments, user devices 512 communicate with application servers 600 to request and update system-level and tenant-level data from ODDBS 516 that may require sending one or more queries. ODDBS 516 automatically generates the one or more SQL queries designed to access the requested data in the database.

Each database can generally be viewed as a collection of objects, such as a set of logical tables, containing data fitted into predefined categories. A "table" is one representation of a data object, and may be used herein to simplify the conceptual description of objects and custom objects. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. "Table," "object," and "entity" may be used interchangeably herein.

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

While one or more implementations and techniques are described with reference to an embodiment in which discovery and recommendation of online learning resources is implemented in a system providing a front end for an on-demand database service capable of supporting multiple tenants, the one or more implementations and techniques are not limited to multi-tenant databases. For instance, embodiments may be implemented on other computing systems such as laptop, a tablet, a PDA, a workstation, a mobile device, a network system such as a LAN, a WAN, etc. Embodiments may also be practiced using database architectures, such as ORACLE®, DB2® by IBM and the like without departing from the scope of the embodiments. The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the present teachings as defined by the following claims, which are to be interpreted in the broadest sense allowable by law.

What is claimed is:

1. A computer program product comprising computer executable code embodied in a non-transitory computer readable medium that, when executing on one or more computing devices, performs the steps of:
    causing a search of a corpus of documents to obtain a search result including a plurality of documents each mentioning at least one of two entities;
    automatically identifying a subset of the plurality of documents wherein each document in the subset contains a co-mention of both of the two entities, wherein the co-mention of both of the two entities comprises mentions of both of the two entities within a same sentence or in adjacent sentences or other surrounding text, in accordance with a rule or a metric used to identify the co-mention of the two entities;
    in response to determining that a number of co-mentions of both of the two entities in the subset is above a predetermined threshold, identifying and substantiating a relationship between the two entities based on text in the documents belonging to the subset;
    in response to determining that the number of co-mentions of both of the two entities in the subset is below the predetermined threshold, initiating an unsupervised multi-hop search within the plurality of documents for identifying and substantiating the relationship between the two entities through an intermediate third entity forming a chain of co-mentions between the first entity and the second entity, by:
        ranking one or more additional entities co-mentioned in the plurality of documents with a first one of the two entities based on graph centrality over normalized entity identifiers;
        iteratively evaluating the one or more additional entities with a beam search algorithm using an A* graph search to calculate a distance from the first one of the two entities to a second one of the two entities; and
        determining an entity from the one or more additional entities that provides a smallest value for the distance from the first one of the two entities to the second one of the two entities and selecting this entity as the third entity; and
    in response to locating the relationship between the two entities through the third entity, providing an identifier for the third entity and one or more segments of text substantiating a supporting co-mention of the third entity and the first one of the two entities.

2. The computer program product of claim 1 wherein using an A* graph search to calculate the distance includes calculating a text embedding to one or more top ranked ones of the one or more additional entities.

3. The computer program product of claim 2 wherein the text embedding uses a universal text embedding for natural language processing.

4. The computer program product of claim 1 further comprising code that performs the step of receiving a selection of the two entities from a user in a user interface.

5. The computer program product of claim 1 further comprising creating a knowledge graph for display in a user interface showing the relationship among the two entities and the third entity.

6. A computer program product comprising computer executable code embodied in a non-transitory computer readable medium that, when executing on one or more computing devices, performs the steps of:
    causing a search of a corpus of documents to obtain a search result including a plurality of documents each mentioning one or more of two entities including a first entity and a second entity;
    automatically identifying a subset of the plurality of documents wherein each document in the subset contains a co-mention of both of the two entities, wherein the co-mention of both of the two entities comprises mentions of both of the two entities within a same sentence or in adjacent sentences or other surrounding text, in accordance with a rule or a metric used to identify the co-mention of the two entities;
    in response to determining that a number of co-mentions of both of the two entities in the subset is below a predetermined threshold, initiating an unsupervised multi-hop search for identifying and substantiating a relationship between the two entities through an intermediate third entity forming a chain of co-mentions with at least one of the first entity and the second entity in one or more of the plurality of documents; and
    in response to locating the relationship between the two entities through the third entity, providing an identifier for the third entity and one or more segments of text substantiating the relationship with a supporting co-mention of the third entity and at least one of the two entities.

7. The computer program product of claim 6 further comprising code that performs the step of updating a knowledge graph containing the first entity and the second entity to include the relationship.

8. The computer program product of claim 7 wherein the relationship is represented in the knowledge graph as a direct relationship between the first entity and the second entity.

9. The computer program product of claim 7 wherein the relationship is represented in the knowledge graph as an indirect relationship between the first entity and the second entity through the third entity.

10. The computer program product of claim 7 further comprising code that performs the step of displaying the knowledge graph including the relationship to a user.

11. The computer program product of claim 7 wherein initiating the multi-hop search includes searching for the relationship through a plurality of intermediate entities forming a chain of co-mentions including text that substantiates the relationship between the first entity and the second entity.

12. The computer program product of claim 6 wherein the search includes a keyword search of the corpus of documents.

13. The computer program product of claim 6 wherein the search includes an entity-based search of the corpus of documents.

14. The computer program product of claim 6 further comprising code that performs the step of revising a search request against the corpus of documents when the search result includes a number of results below a second predetermined threshold.

15. The computer program product of claim 6 wherein the multi-hop search for the relationship between the two entities includes scoring one or more additional entities in the plurality of documents based on graph centrality over normalized entity identifiers.

16. The computer program product of claim 6 wherein the multi-hop search for the relationship between the two entities includes performing an A* graph search over a truncated document space using a semantic similarity function to evaluate a semantic distance to one of the two entities.

17. The computer program product of claim 6 wherein the multi-hop search for the relationship between the two entities includes evaluating a semantic distance to one of the two entities by calculating a sentence embedding using an embedding model trained for natural language processing.

18. The computer program product of claim 6 wherein the multi-hop search for the relationship between the two entities includes a beam search algorithm for iteratively evaluating semantic distances.

19. A system comprising:
a server coupled in a communicating relationship with a network;
a memory on the server storing computer executable code; and
a processor configured by the computer executable code to provide a user interface for receiving a selection of two entities including a first entity and a second entity from a user over the network, the process further configured by the computer executable code to cause a search of a corpus of documents to obtain a search result including a plurality of documents each mentioning one or more of the two entities, to automatically identify a subset of the plurality of documents wherein each document in the subset contains a co-mention of both of the two entities, wherein the co-mention of both of the two entities comprises mentions of both of the two entities within a same sentence or in adjacent sentences or other surrounding text, in accordance with a rule or a metric used to identify the co-mention of the two entities, in response to determining that a number of co-mentions of both of the two entities in the subset is below a predetermined threshold, to initiate an unsupervised multi-hop search for identifying and substantiating a relationship between the two entities through an intermediate third entity forming a chain of co-mentions with at least one of the first entity and the second entity in one or more of the plurality of documents, and in response to locating the relationship between the two entities through the third entity, presenting to the user through the user interface an identifier for the third entity and one or more segments of text substantiating the relationship with a supporting co-mention of the third entity and at least one of the two entities.

20. The system of claim 19 further comprising a database storing the corpus of documents.

\* \* \* \* \*